Patented July 14, 1942

2,290,120

UNITED STATES PATENT OFFICE 2,290,120

CHEWING GUM PRODUCT AND METHOD OF PREPARING SAME

Christopher F. Thomas, Toronto, Ontario, Canada

No Drawing. Application September 14, 1940, Serial No. 356,825

14 Claims. (Cl. 99—135)

My invention relates to chewing gum products and is particularly concerned with the preparing of chewing gum confections although, as will be seen hereinafter, the novel principles may be applied to the preparation of chewing gum products broadly.

Conventional chewing gum is made by combining together, in a suitable mixer, melted chicle or other chewing gum base, commercial liquid corn syrup, powdered sugar and flavor, with or without supplemental agents which produce desired modifications of texture, chewing characteristics and the like. The plastic chewing gum mass is then passed through rolls and sheeting and scoring machines in accordance with practices well known in the art to produce the usual chewing gum of commerce.

The chewing characteristics of chewing gum are graded by those versed in the art in accordance with the following: (1) the initial chew or, in other words, the chewing characteristics when the chewing gum is first placed in the mouth; (2) the intermediate chew or, in other words, the chewing characteristics at the time when the bulk of the soluble materials of the chewing gum is being leached out in the mouth; and (3) the final chew or, in other words, the chewing characteristics after substantially all of the solubles of the chewing gum have been chewed or leached out. In order for a chewing gum to be graded 100%, each of these three stages in the chew would be required to have a rating of 100%.

In a good chewing gum, the final chew is normally close to perfection since the formulation of the base is predicated on the obtaining of this characteristic or property. While the final chew is of excellent character, the usual result is that such characteristic is obtained at the expense of the grade or quality of the initial and intermediate chews, the initial chew being too stiff and the intermediate chew being too soft. An enormous amount of research work has been carried out in an effort to obtain a softening of the initial chew and a stiffening of the intermediate chew while, at the same time, maintaining the high quality of the final chew.

In accordance with my present invention, novel chewing gum products are produced with superior chewing characteristics. While the final chew is of essentially the same character as that of the conventional chewing gum, the initial and intermediate chews are markedly superior, particularly the initial chew which is considerably softer. This results largely from the novel procedure of making the chewing gum as a result of which its center is relatively porous whereas its surface is somewhat compact, there being what might almost be characterized as a shell on the surface of the pieces of the chewing gum. The solubles appear to dissolve somewhat more slowly and the soft mushiness of the intermediate chew, characteristic of conventional chewing gums, is absent and in place thereof is a desirable gummy firmness.

The novel chewing gums of my present invention comprise a coherent, pressed or compressed mass of discrete, finely divided particles of chewing gum base material, such as chicle or jelutong or mixtures thereof, as more fully pointed out hereinafter, and finely divided sweetening materials such as pulverulent sucrose, glucose, or other sugars or the like, and flavoring constituents, with or without supplemental agents, hereinafter mentioned.

In preparing the novel chewing gum products of my invention, the chewing gum base, preliminarily cleaned and purified, is reduced to pulverulent form in any suitable manner. I have found it to be highly satisfactory to refrigerate or freeze the chewing gum base so that it is rendered relatively rigid and then to comminute the frozen base in any suitable way to particles of the desired size. Such particles may, of course, vary in size within relatively wide limits but, in general, excellent results are obtained when the majority of the particles are in the range which will pass through a 90 mesh screen and preferably through a 100 mesh screen. The particles of chewing gum base material are then mixed with pulverulent commercial corn syrup and powdered sugar, of at least about the same degree of fineness as that of the particles of chewing gum base, and with a suitable flavor, all in the desired proportions, and the resulting mixture is pressed or compressed into the particular shape sought. The pulverulent corn syrup may conveniently be produced by freezing the commercial liquid corn syrup, pulverizing or powdering it, and then sieving to obtain particles of the desired size. The flavoring, which constitutes only a very small proportion of the product, may be utilized in the liquid form or in any desired state.

In order that those skilled in the art may even more fully appreciate the character and scope of the invention, I set forth hereinbelow one specific embodiment for carrying out the novel teachings of my invention. It will be understood that this embodiment is illustrative and in no wise limitative of the full scope of my invention. Thus, for example, different base mixtures of gums, guttas, resins and the like may be utilized, with or without supplemental agents, the proportions of the ingredients may be varied, and other changes may be made within limits without departing from the spirit and teachings of my invention herein.

Commercial corn syrup is frozen by subjecting the same to a temperature of about −20 degrees F. The frozen product is ground, preferably in a cold room and while maintaining the grinder or grinding elements at about 0 degrees F. The ground, pulverulent product is then screened so as to collect those particles which pass through a 90 mesh screen and preferably through 100 mesh screen. The coarser particles, namely, those which remain on the screen, are reground either alone or together with freshly frozen corn syrup so as to obtain discrete particles of the fineness indicated. The ground, finely divided or powdered particles of corn syrup are then stored under conditions of low temperature and low relative humidity so as to prevent melting or coalescing of the particles.

Dry Mexican chicle, previously cleaned and purified, containing from about 2% to about 5% moisture, is frozen by subjecting the same to a temperature of about −10 degrees F. The frozen chicle is then ground under the same conditions described hereinabove in connection with the corn syrup so as to provide particles which pass a 100 mesh screen.

About 19 parts by weight of the corn syrup powder and about 20 parts by weight of the finely divided chicle are mixed together with about 60 parts by weight of powdered sugar (XXXX) and about 1 part by weight of a desired flavoring material to provide a homogeneous mixture. The mixing preferably is carried out in a rotary drum at either room temperature or somewhat below and preferably under conditions of low relative humidity. The homogeneous mixture is then passed through a "Colton" or "Stokes-Smith" tableting machine to produce coherent tablets, a relatively low pressure being used, preferably of the order of 40 lbs./sq. in. The resulting chewing gum product may then be packaged or, alternatively, it may be coated with the usual candy coating or any other desired coating and then packaged for distribution.

The temperatures at which the corn syrup and chicle are frozen prior to the comminution or grinding thereof are, of course, subject to relatively wide variation. In general, temperatures of the order of −10 degrees F. to −30 degrees F. for the corn syrup and of the order of 0 degrees F. to −20 degrees F. for the chicle or other chewing gum base are quite satisfactory although temperatures somewhat above or below these ranges give good results. It will be understood that the commercial corn syrup and the chicle or other chewing gum base may be frozen together and ground together instead of separately, although, for best results, I prefer to freeze and grind them separately. While I find it quite desirable to utilize the step of freezing followed by comminution to reduce the liquid corn syrup and chicle to discrete, finely divided or powdered particles, it will be understood that my invention encompasses, in its broader aspects, any manner of producing or providing discrete, finely divided or powdered corn syrup and chicle or other chewing gum base so that particles thereof may be admixed with powdered sucrose or the like and compressed to form a coherent body in tablet or any other desired shape or form.

The chewing gum base materials which may be employed in the practice of my invention may be selected from a large group, representative examples of which are Mexican chicle, jelutong, gutta soh, gutta siak, gutta percha, balata, Perillo, Leche Caspi, ester gum, resins and resenes of various types including coumarone-indene resins, vinyl resins, petroleum resins, gutta katiau, mastic, kauri, dammar, rubber latex, crepe rubber, and the like, or blends of any two or more thereof. The invention is of especial utility in connection with confection products prepared from chicle, jelutong or mixtures thereof, or gutta soh, gutta siak, gutta katiau, and Leche Caspi alone or in admixture with chicle or jelutong.

For obtaining particular effects on texture, smoothness, cohesiveness and the like, various modifying agents may, if desired, be incorporated in the confection composition, for example, gum arabic, stearine, hydrogenated oils, waxes such as paraffins, beeswax, ceresin wax, carnauba wax, candelilla wax, spermaceti, petrolatum, cocoa butter, lanolin, phosphatides such as lectithins or cephalins, and the like. Those of said materials which are pulverulent or may be rendered so may, of course, be incorporated with the other ingredients in the mixer or blender. The normally liquid materials or those which readily can be rendered liquid may be sprayed onto the other ingredients in the mixer or blender. The greasy or oleaginous addition materials may be blended into the chewing gum base and the resulting base treated as described hereinabove to convert the same to pulverulent or powder form.

For special purposes, different sugars or sweetening agents may be utilized such as lactose, dextrose, maltose and the like. However, since the usual chewing gum contains commercial corn syrup and sucrose, I particularly prefer to utilize said sweetening materials. I also prefer to utilize the ingredients in substantially the same proportions as they are employed in the ordinary chewing gum. However, the proportions of the various ingredients may vary somewhat without in any way departing from the spirit of my invention.

In addition to the advantages which my present invention brings about with respect to improvements in the chewing characteristics, still other advantages result. Thus, for example, each individual piece of the chewing gum of my present invention is substantially uniform in size and shape. This results not only in better looking unit pieces but also in higher wrapping machine production and lower wrapping machine material waste. In the manufacture of the conventional chewing gum, the sheeting of the warm chewing gum mass to make sticks or the like, while economical and convenient, results in the delivery of unit pieces which are not all of the same size or dimensions since a varying amount of stretching tension is given to unit pieces in various parts of the sheet. A still further advantage of my present invention resides in connection with the preparation of sugar-coated chewing gum. Since the chewing gum products of my invention have a smooth and glossy surface, they can be coated uniformly without difficulty by the usual panning procedure whereas chewing gum centers made by conventional methods usually show inequalities in the surface which show up as greyish spots in the finished sugar-coated pieces unless much care and expert attention is exercised during the coating operation.

It will be understood that the term "compressing", as used hereinabove and in the claims, is intended to cover any operation involving the application of pressure to the mixture of the chewing gum base and other ingredients. While I prefer to employ a tableting machine, other types of equipment may be utilized such as hydraulic presses, stamping machines, extruding devices, and the like.

It is preferred that the final chewing gum product contain on the order of about 3% to about 5% moisture and, therefore, the proportions of ingredients utilized together with their moisture contents should be taken into consideration in working out any particular compositions or formulae.

While I have described my invention in detail, it will be understood that variations and modifications may be made without departing from the spirit thereof, as exemplified by the appended claims.

What I claim as new and desire to protect by Letters Patent of the United States is:

1. A method which comprises providing finely divided, discrete, solid particles each of a chewing gum base and at least one sugar, mixing said particles to provide a substantially homogeneous mixture, and compressing said mixture to form a coherent body.

2. A method which comprises providing finely divided, discrete, solid particles each of a chewing gum base, a sugar, and corn syrup, mixing said particles to provide a substantially homogeneous mixture, and compressing said mixture to form a coherent body.

3. A method which comprises providing finely divided, discrete, solid particles of a chewing gum base, sucrose, and corn syrup, said particles having a size such that substantially all of them will pass through a 90 mesh screen, mixing said particles to provide a substantially homogeneous mixture, and compressing said mixture to form a coherent body.

4. A method in accordance with claim 3, wherein the sucrose is present in predominating proportions and the chewing gum base and corn syrup are present in minor but generally similar proportions.

5. A method which comprises freezing a chewing gum base material, comminuting said frozen material, mixing the comminuted particles with solid particles of sugar and corn syrup, and compressing the mixture to form a coherent confection body.

6. A method of making confections which comprises freezing a chewing gum base at a temperature of about 0 degrees F. to about −20 degrees F., freezing commercial corn syrup at a temperature of about −10 degrees F. to about −30 degrees F., comminuting said materials to provide particles which will pass through approximately a 100-mesh screen, mixing the particles with finely powdered sucrose, and compressing the mixture to form a coherent body.

7. A method in accordance with claim 6, wherein the chewing gum base comprises approximately 20%, the corn syrup about 19%, and the sucrose about 60% of the confection.

8. A method which comprises providing a frozen chewing gum base and frozen corn syrup, comminuting said frozen materials, mixing the comminuted particles with pulverulent particles of sucrose, and compressing the mixture to form a coherent confection body.

9. A method of making confections which comprises freezing a chewing gum base, freezing corn syrup, comminuting said frozen materials so as to provide particles which will pass through a screen of at least 90 mesh, mixing the comminuted particles with particles of sucrose having a fineness of at least the order of that of the particles of chewing gum base, and compressing the mixture to form a coherent confection body.

10. A chewing gum product comprising a coherent, compressed mixture of discrete particles of comminuted chewing gum base material and at least one sugar.

11. A chewing gum product comprising a coherent, compressed mixture of finely divided solid particles each of chewing gum base material, sucrose, and corn syrup.

12. A chewing gum product comprising a coherent, compressed mixture of initially finely divided solid particles each of a chewing gum base material comprising chicle, sucrose, and corn syrup.

13. Chewing gum comprising a coherent, compressed mixture of finely divided solid particles of a chewing gum base and sweetening material.

14. A chewing gum comprising a coherent, compressed mixture of initially finely divided solid particles each of chewing gum base material, sucrose, and corn syrup, said ingredients being present in proportions of about 20% chewing gum base material, about 60% sucrose, and about 19% corn syrup.

CHRISTOPHER F. THOMAS.